(12) United States Patent
D'Amico et al.

(10) Patent No.: US 9,992,479 B2
(45) Date of Patent: *Jun. 5, 2018

(54) DEVICES AND METHODS FOR AN IMAGING SYSTEM WITH A DUAL CAMERA ARCHITECTURE

(71) Applicant: Google LLC, Mountain View, CA (US)

(72) Inventors: Sam D'Amico, Stanford, CA (US); Xiaoyu Miao, Sunnyvale, CA (US); Babak Parviz, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/265,867

(22) Filed: Sep. 15, 2016

(65) Prior Publication Data

US 2017/0006277 A1 Jan. 5, 2017

Related U.S. Application Data

(63) Continuation of application No. 13/960,920, filed on Aug. 7, 2013, now Pat. No. 9,473,708.

(51) Int. Cl.
| | |
|---|---|
| *H04N 13/00* | (2018.01) |
| *H04N 5/265* | (2006.01) |
| *H04N 5/225* | (2006.01) |
| *H04N 13/02* | (2006.01) |

(52) U.S. Cl.
CPC ....... *H04N 13/0239* (2013.01); *H04N 5/2258* (2013.01); *H04N 5/265* (2013.01)

(58) Field of Classification Search
CPC ... H04N 13/0239; H04N 5/2258; H04N 5/265
See application file for complete search history.

(56) References Cited

U.S. PATENT DOCUMENTS

| | | |
|---|---|---|
| 7,483,065 B2 | 1/2009 | Gruhlke et al. |
| 8,077,964 B2 | 12/2011 | Berestov et al. |
| 9,185,291 B1 | 11/2015 | Shabtay et al. |
| 9,402,032 B2 | 7/2016 | Dror et al. |
| 9,538,152 B2 | 1/2017 | Shabtay et al. |
| 9,568,712 B2 | 2/2017 | Dror et al. |
| 2002/0118210 A1* | 8/2002 | Yuasa ................ H04N 1/6052 345/589 |
| 2008/0211941 A1 | 9/2008 | Deever et al. |
| 2009/0015662 A1 | 1/2009 | Kim et al. |

(Continued)

*Primary Examiner* — Anner N Holder
(74) *Attorney, Agent, or Firm* — McDonnell Boehnen Hulbert & Berghoff LLP

(57) ABSTRACT

An electronic device can include a first image sensor configured to capture a first image of a field of view and a second image sensor configured to capture a second image of the field of view. The electronic device can include a color filter adjacent to the second image sensor such that the field of view is viewable by the second image sensor through the color filter. The first image can have a first pixel resolution. The second image can have a second pixel resolution. The electronic device can include a controller configured to determine a third image based on luminance content of the first image and color content of the second image. The third image can have a third pixel resolution indicative of a spatial resolution of the first image and a spectral resolution of the second image.

19 Claims, 9 Drawing Sheets

(56) References Cited

U.S. PATENT DOCUMENTS

| | | |
|---|---|---|
| 2009/0097697 A1 | 4/2009 | Miyake |
| 2009/0207272 A1 | 8/2009 | Culbert et al. |
| 2010/0110094 A1* | 5/2010 | Kamibayashi ......... G09G 3/003 345/589 |
| 2011/0074931 A1 | 12/2011 | Bilbrey et al. |
| 2012/0044328 A1 | 2/2012 | Gere |
| 2014/0232900 A1 | 8/2014 | Wernersson |
| 2015/0085174 A1 | 3/2015 | Shabtay et al. |

* cited by examiner

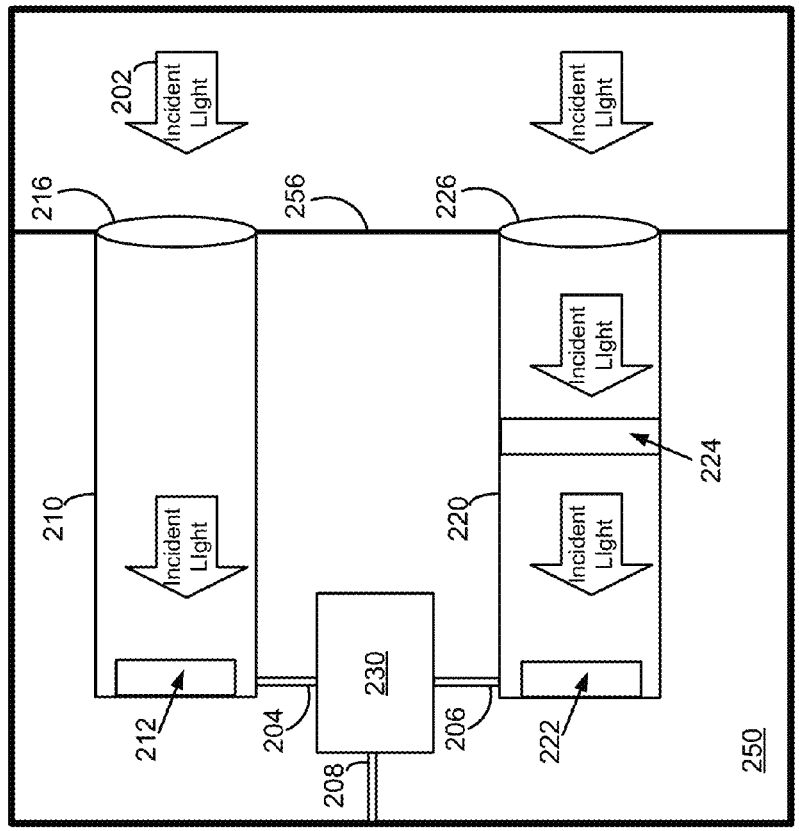
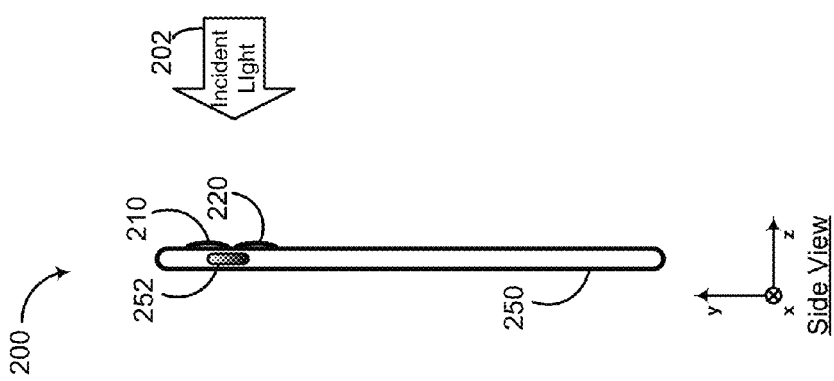
FIG. 2D
FIG. 2C

DEVICES AND METHODS FOR AN IMAGING SYSTEM WITH A DUAL CAMERA ARCHITECTURE

CROSS-REFERENCE TO RELATED APPLICATION

This application is a continuation of U.S. application Ser. No. 13/960,920, filed Aug. 7, 2013, the contents of which are entirely incorporated herein by reference as if fully set forth in this application.

BACKGROUND

An electronic device such as a notebook computer, cellular phone, tablet, etc. can include a camera to capture images. In some cases, the camera may exhibit poor light sensitivity due to a small aperture of the camera or due to color filters also included in the camera. The color filters can also reduce the potential sharpness and resolution of the image by requiring some form of interpolation to reconstruct the color data over the entire image.

One solution for this problem could be to employ a larger camera. However, due to industrial design requirements for usability, aesthetics, etc., this solution may not be desirable.

SUMMARY

In one example, a device is provided that comprises a first image sensor configured to capture a first image of a field of view of the device. The first image can have a first pixel resolution. The first pixel resolution can be indicative of a spatial resolution of the first image. The first image can include a representation of a luminance content of the field of view. The device also comprises a second image sensor configured to capture a second image of the field of view of the device. The second image can have a second pixel resolution. The second pixel resolution can be indicative of the spectral resolution of the second image. The device also comprises a color filter. The color filter can be arranged such that the field of view is viewable by the second image sensor through the color filter. The second image can include a representation of a color content of the field of view due to the color filter. The device also comprises a controller configured to determine a third image of the field of view based on the first image and the second image. The third image can be based on luminance content of the first image and color content of the second image. The third image can have a third pixel resolution indicative of the spatial resolution of the first image and the spectral resolution of the second image.

In another example, a method is provided. The method comprises capturing a first image of a field of view by a first image sensor. The first image can have a first pixel resolution. The first pixel resolution can be indicative of a spatial resolution of the first image. The first image can include a representation of a luminance content of the field of view. The method further comprises capturing a second image of the field of view by a second image sensor. The second image can have a second pixel resolution. The second pixel resolution can be indicative of a spectral resolution of the second image. The second image can include a representation of a color content of the field of view based on a color filter adjacent to the second image sensor. The color filter can be arranged such that the field of view is viewable by the second image sensor through the color filter. The method further comprises determining a third image based on the first image and the second image. The third image can be based on luminance content of the first image and color content of the second image. The third image can have a third pixel resolution indicative of the spatial resolution of the first image and the spectral resolution of the second image.

In another example, a device is provided comprising a means for capturing a first image of a field of view by a first image sensor. The first image can have a first pixel resolution. The first pixel resolution can be indicative of a spatial resolution of the first image. The first image can include a representation of a luminance content of the field of view. The device also comprises a means for capturing a second image of the field of view by a second image sensor. The second image can have a second pixel resolution. The second pixel resolution can be indicative of a spectral resolution of the second image. The second image can include a representation of a color content of the field of view based on a color filter adjacent to the second image sensor. The color filter can be arranged such that the field of view is viewable by the second image sensor through the color filter. The device also comprises a means for determining a third image based on the first image and the second image. The third image can be based on luminance content of the first image and color content of the second image. The third image can have a third pixel resolution indicative of the spatial resolution of the first image and the spectral resolution of the second image.

In another example, another method is provided. The method comprises receiving a first image of a field of view from a first image sensor. The first image can have a first pixel resolution. The first pixel resolution can be indicative of a spatial resolution of the first image. The first image can include a representation of a luminance content of the field of view. The method further comprises receiving a second image of the field of view from a second image sensor. The second image can have a second pixel resolution. The second pixel resolution can be indicative of a spectral resolution of the second image. The second image can include a representation of a color content of the field of view based on a color filter adjacent to the second image sensor. The color filter can be arranged such that the field of view is viewable by the second image sensor through the color filter. The method further comprises determining a third image based on the first image and the second image. The third image can be based on luminance content of the first image and color content of the second image. The third image can have a third pixel resolution indicative of the spatial resolution of the first image and the spectral resolution of the second image.

In another example, a device is provided comprising a means for receiving a first image of a field of view from a first image sensor. The first image can have a first pixel resolution. The first pixel resolution can be indicative of a spatial resolution of the first image. The first image can include a representation of a luminance content of the field of view. The device also comprises a means for receiving a second image of the field of view from a second image sensor. The second image can have a second pixel resolution. The second pixel resolution can be indicative of a spectral resolution of the second image. The second image can include a representation of a color content of the field of view based on a color filter adjacent to the second image sensor. The color filter can be arranged such that the field of view is viewable by the second image sensor through the color filter. The device also comprises a means for determining a third image based on the first image and the second image. The third image can be based on luminance content of the first image and color content of the second image. The third image can have a third pixel resolution indicative of the spatial resolution of the first image and the spectral resolution of the second image.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 2C is a side view of the example device shown in FIGS. 2A and 2B.

FIG. 2D is a block diagram of the example device shown in FIG. 2C.

DETAILED DESCRIPTION

Figure 1:
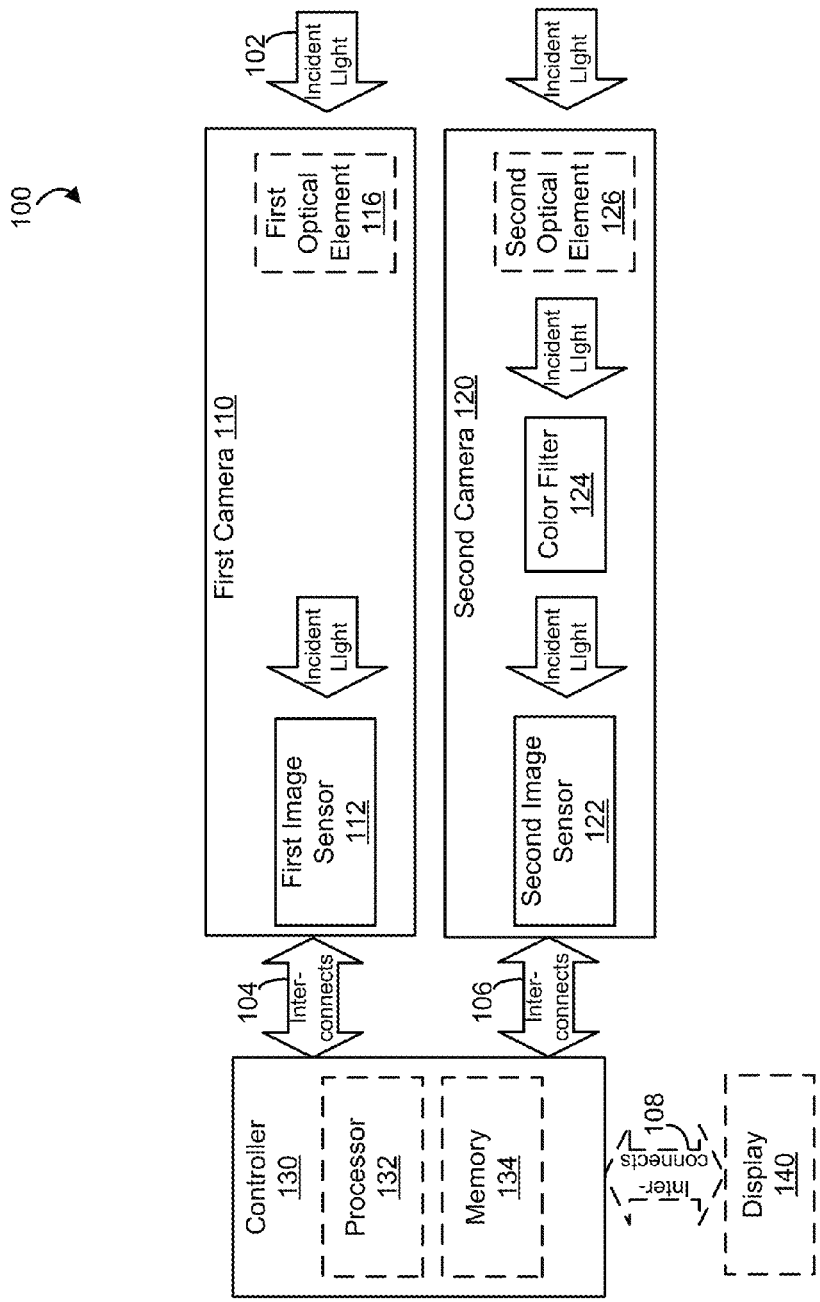
FIG. 1 is a block diagram of an example imaging system.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

An electronic device may be utilized to obtain an image of a field of view of the electronic device. Within examples described herein, a device, such as a digital camera, computing device, wearable device, mobile device, cellular phone, tablet, etc., including two image sensors is provided. The device can be configured to provide an image containing luminance content from one image sensor of the two image sensors and color content from another image sensor of the two image sensors.

Within a specific example, a device is provided that includes a first image sensor and a second image sensor configured, respectively, to obtain a first image having a first pixel resolution and a second image having a second pixel resolution, of a field of view of the device. The first pixel resolution can be indicative of a spatial resolution of the first image. The second pixel resolution can be indicative of a spectral resolution of the second image. The first image can include a representation of a luminance content of the field of view. The device can also include a color filter adjacent to the second image sensor such that the field of view is viewable by the second image sensor through the color filter. The second image can include a representation of a color content of the field of view due to the color filter. The device can also include a controller configured to determine a third image based on luminance content of the first image and color content of the second image. The third image can have a third pixel resolution indicative of the spatial resolution of the first image and the spectral resolution of the second image. The device can optionally include a display and the controller can be further configured to provide the third image to the display.

In some examples, the first pixel resolution of the first image is greater than the second pixel resolution of the second image. In this example, the controller can be configured to provide the third image having the third pixel resolution that is substantially same as the first pixel resolution of the first image.

In some examples, the controller can be configured to determine luminance content of the second image. For example, the second image can be substantially dark (e.g., low luminance content) due to the color filter and/or low luminance content reaching the second image sensor from the field of view. For example, the luminance content of the second image can be compared to a first threshold value corresponding to low luminance content and, based on the comparison (e.g., luminance content of the second image is less than the first threshold value), the controller can be configured to provide the first image as the third image. In that case, the first image may include significantly more features from the field of view than the second image. Thus, in this example, the controller can be configured to provide the first image as the third image. In this example, the controller provides the first image as the third image substantially lacking color content similarly to human perception of dark environments. Additionally or alternatively, the controller can be configured to determine the color content of the second image. For example, the controller can be configured to determine the second image having substantially low color content (e.g., bar code). For example, the color content of the second image can be compared to a second threshold value corresponding to low color content. In this example, based on the comparison (e.g., the color content being less than the second threshold value), the controller can also be configured to provide the first image as the third image. Additionally or alternatively, the color content of the second image can be noisy and thus providing the first image as the third image can result in a higher quality third image than a combination of the first image and the second image. Thus, in these examples, the device provides a method of using the first image as the third image instead of combining the first image and the second image to determine the third image.

In some examples, the controller can be configured to perform, based on a spatial arrangement of the first image sensor and the second image sensor, an alignment of features in the first image with corresponding features in the second image to determine the third image.

In some examples, the controller can be configured to use a parallax effect due to misalignment between the first image and the second image. In some examples, the controller can be configured to determine depth information of the field of view based on the alignment and the spatial arrangement. Additionally or alternatively, the controller can be configured to determine a three-dimensional image of the field of view based on the third image and the depth information.

In some examples, the controller can be configured, based on a result of the alignment, to provide the second image as the third image. For example, macrophotography applications requiring a small depth of focus may result in a substantial misalignment (e.g., unsuccessful result of the alignment) between the first image and the second image due to the parallax effect. Thus, in this case, due to the substantial misalignment (e.g., the result of the alignment being unsuccessful), the controller can be configured to provide the second image as the third image. In this example, the third image based on the second image only can include significantly higher quality than a combination of the first image and the second image. Thus, in this example, the device provides a method of using the second image as the third image instead of combining the first image and the second image to determine the third image.

The device can optionally include a first optical element and a second optical element configured to focus light from the field of view, respectively, onto the first image sensor and the second image sensor. In some examples, the first optical element and the second optical element can be configured to provide a substantially same depth of field, respectively, to the first image sensor and the second image sensor. In these examples, the controller can be configured to align features of the first image with corresponding features of the second image based on the substantially same depth of field.

In some examples, the controller can be configured to operate the first image sensor and the second image sensor to control the luminance content of the first image and luminance content of the second image based on focal numbers of the first optical element and the second optical element.

Additionally or alternatively, the first optical element and the second optical element can be configured to have substantially same focal numbers. For example, the device can be configured such that the luminance content of the first image is greater than the luminance content of the second image based on the substantially same focal numbers and the color filter adjacent to the second image sensor.

Some embodiments of the present disclosure therefore provide systems and methods for combining a first image from a first image sensor with a second image from a second image sensor to determine a third image. Such determined third image can have a spatial resolution substantially same as a spatial resolution of the first image and a spectral resolution substantially same as a spectral resolution of the second image.

FIG. 1 is a block diagram of an example imaging system 100. In some examples, the imaging system 100 can be included in a smart phone, digital assistant, digital camera, body-mounted computing device (e.g., eye-glasses with computing capability), or any other computing device configured to provide an image of a field of view of the imaging system 100. The imaging system 100 can be configured to receive incident light 102 from a field of view of the imaging system 100. The incident light 102 can be received by a first camera 110 and a second camera 120 that are both included in the imaging system 100. The first camera 110 and the second camera 120 can provide information to a controller 130 indicative of the incident light 102 from the field of view of the imaging system 100, respectively, via interconnects 104 and 106. In some embodiments, the imaging system 100 can include a display 140 configured to receive an image from the controller 130 via interconnects 108 for display.

The first camera 110 includes a first image sensor 112 configured to capture a first image of the field of view of the imaging system 100 based on the incident light 102. The first image captured by the first image sensor 112 can have a first pixel resolution and can include a representation of a luminance content of the field of view of the imaging system 100. Resolution is a measure of detail that an image holds. For example, spatial resolution can be a measure of how closely lines (e.g., edges) can be resolved in the image (e.g., perceived by person looking at the image). In another example, spectral resolution can be a measure of distinction between a light including more than one spectrum (e.g., multiple wavelengths, different colors, etc.). In examples including a digital image, resolution can be measured as pixel resolution. Pixel resolution can be a number of pixels per unit area of the digital image. In some examples, the first pixel resolution of the first image can be indicative of a spatial resolution of the first image. For example, the spatial resolution of the first image can correspond to resolution of spatial features represented in the incident light 102 from the field of view of the imaging system 100.

The first image sensor 112 included in the first camera 110 can include, for example, an array of semiconductor pixel sensors configured to receive the incident light 102 and provide data indicative of the first image of the field of view to the controller 130 via the interconnects 104. In other examples, the first image sensor 112 may include a charge-coupled device (CCD). In some examples, the first image sensor 112 may be coupled to a printed circuit board and arranged to receive the incident light 102 and provide the data indicative of the first image through the printed circuit board and interconnects 104 to the controller 130.

The first camera 110 can optionally include a first optical element 116. The first optical element 116 can be configured to focus incident light 102 onto the first image sensor 112 to facilitate determining the first image by the first image sensor 112. The first optical element 116 may comprise one or more lens, mirrors, prisms, filters or any other component configured to process incident light 102 propagating towards the first optical element 116 from the field of view of the imaging system 100. The first optical element 116 can be configured to direct, reflect, and/or focus the incident light 102 from the field of view onto the first image sensor 112.

Although not illustrated in FIG. 1, the first camera 110 can optionally include an actuator coupled to the first optical element 116 and configured to cause a change in a position of the first optical element 116 to control focus of the first image generated by the first image sensor 112. In some examples, the actuator can be controlled by the controller 130 via interconnects 104. In some examples, the actuator may comprise a voice coil motor (VCM), a piezoelectric actuator, MEMS, or a shape memory alloy.

The second camera 120 included in the imaging system 100 includes a second image sensor 122 configured to capture a second image of the field of view of the imaging system 100 based on the incident light 102. The second image captured by the second image sensor 122 can have a second pixel resolution. The second camera 120 can include a color filter 124 arranged along a path of the incident light 102 such that the field of view of the imaging system 100 is viewable by the second image sensor 122 through the color filter 124. The second image can include a representation of a color content of the field of view of the imaging system 100 due to the color filter 124. The second pixel resolution of the second image can be indicative of a spectral resolution (e.g., resolution of colors, different wavelengths, etc.) of the second image. For example, the spectral resolution of the second image can correspond to resolution of spectral features (e.g., colors) represented in incident light 102 from the field of view of the imaging system 100.

In some examples, the configuration, structure, operation, and arrangement of the second image sensor 122 can be similar to the first image sensor 112 included in the first camera 110. In some embodiments, the second camera 120 can include a second optical element 126 similar to the first optical element 116 included in the first camera 110. In some embodiments, the second camera 120 can include a second actuator similar to the actuator described in the discussion for the first camera 110.

The color filter 124 included in the second camera 120 can be arranged adjacent to the second image sensor 122 such that the incident light 102 from the field of view of the imaging system 100 is viewable by the second image sensor 122 through the color filter 124. The color filter 124 may comprise a Bayer filter, RGBE filter, CYYM filter, CYGM filter, RGBW filter or any other color filter known in the art configured to selectively allow wavelengths of light included in the incident light 102 through the color filter 124 to facilitate the second image sensor 122 capturing the second image including a representation of color content (e.g., chrominance, chroma data, etc.) of the field of view of the imaging system 100. In some examples, the color filter 124 can be manufactured using color dyes such as color photoresists (e.g., CMCR101R, CMCR101Q CMCR101B, etc.).

In some examples, the functions of the color filter 124 can be included in the second image sensor 122. For example, the second image sensor 122 can be a charge-coupled device (CCD) configured to generate the second image including color content without color filter 124. Thus, in this example, the second image sensor 122 and the color filter 124 can be the same physical component. In other examples, the second optical element 126 may include a color filter such that the second optical element 126 and the color filter 124 are the same physical component.

The controller 130 can be configured to operate the first camera 110 and the second camera 120 to obtain data corresponding to the first image and the second image via interconnects 104 and 106. In some examples, the controller 130 can be included in a computing device. In other examples, the controller 130 can be a remote server configured to receive the data corresponding to the first image and the second image. In some examples, the controller 130 can be configured to determine a third image of the field of view based on the first image and the second image. The controller 130 can be configured to determine the third image based on luminance content of the first image and color content of the second image. The third image can have a third pixel resolution indicative of the spatial resolution of the first image and the spectral resolution of the second image.

In some examples, the first image sensor 112 and the second image sensor 122 can be configured such that the first pixel resolution of the first image is greater than the second pixel resolution of the second image. As mentioned earlier, the first pixel resolution can be indicative of the spatial resolution of the first image and the second pixel resolution can be indicative of the spectral resolution of the second image. In some examples, the spatial resolution can correspond to resolution of spatial features (e.g., lines, edges, etc.) within the field of view of the imaging system 100. Additionally, in some examples, the spectral resolution can correspond to resolution of spectral features (e.g., colors) within the field of view. Human perception of spatial resolution is greater than spectral resolution. That is, humans are more sensitive to spatial aspects (e.g., sharpness of edges, separation between lines, etc.) than spectral aspects (e.g., color, chrominance, etc.). Thus, the first image containing luminance content (e.g., luma data, brightness, etc.) with the greater first pixel resolution can be combined via the controller 130 with the second image containing color content (e.g., chrominance, chroma data, etc.) having lower second pixel resolution to provide the third image having a third pixel resolution substantially same as the first pixel resolution. In this example, the third image can be perceived having a greater brightness, sharpness and resolution than the second image while including the color content of the second image. Thus, in the example of the digital image, the third image can have substantially same number of pixels per unit area (e.g., pixel resolution) as the first image while including color content extracted from the second image having lower pixels per unit area (e.g., pixel resolution). For example, a viewer of the third image may not perceive the lower spectral resolution (e.g., color content) of the third image due to lower spectral sensitivity of the viewer's eyes while perceiving the greater spatial resolution and luminance (e.g., brightness) of the third image due to the higher spatial sensitivity of the viewer's eyes.

In some examples, the controller 130 can be configured to perform an alignment of features in the first image with corresponding features in the second image to determine the third image. For example, the controller 130 can determine an edge of an object in the first image and a corresponding edge in the second image. Thus, the controller 130 can align the first image and the second image based on the edge and the corresponding edge to determine the third image.

In some examples, the controller 130 can be configured, based on a result of the alignment, to provide the second image as the third image. For example, macrophotography applications requiring a small depth of focus may result in a substantial misalignment (e.g., unsuccessful result of the alignment) between the first image and the second image due to a parallax effect. Thus, in this case, due to the substantial misalignment (e.g., the result of the alignment being unsuccessful), the controller 130 can be configured to provide the second image as the third image. In this example, the third image based on the second image only can include significantly higher quality than a combination of the first image and the second image.

In some examples, the controller 130 can be configured to determine luminance content of the second image generated by the second image sensor 122 and provide the first image as the third image based on the determined luminance content of the second image. For example, the second image can be substantially dark (e.g., low luminance content) due to the color filter 124 and/or low luminance content reaching the second image sensor 122 from the field of view. In that case, the first image may include substantially more features from the field of view than the second image. For example, the luminance content of the second image can be compared to a first threshold value corresponding to low luminance content. Thus, in this example, based on the luminance content of the second image being less than the first threshold value, controller 130 can be configured to provide the first image as the third image. In this example, the controller 130 can provide the first image as the third image substantially lacking color content similarly to human perception of dark environments.

Additionally or alternatively, the controller 130 can be configured to determine the color content of the second image. For example, the controller 130 can be configured to determine the second image having substantially low color content (e.g., bar code). For example, the color content of the second image can be compared to a second threshold value. In this example, based on the color content of the second image being less than the second threshold value, the controller 130 can also be configured to provide the first image as the third image.

In some examples, the controller 130 can be configured to perform, based on a spatial arrangement of the first image sensor 116 and the second image sensor 126, an alignment of features in the first image with corresponding features in the second image to determine the third image. For example, the first image sensor 116 and the second image sensor 126 can be proximally arranged along a same axis a given distance from each other. Thus, in this example, the controller 130 can be configured to perform the alignment based on the given distance along the same axis.

In some examples, the controller 130 can be configured to use a parallax effect due to misalignment between the first image and the second image. For example, the controller 130 can be configured to determine depth information of the field of view of the imaging system 100 based on the alignment and the spatial arrangement. For example, features of an object (e.g., in the field of view) in the first image can be determined to be at a particular distance from corresponding features of the object in the second image when the first image is superimposed on the second image. Thus, in this example, the controller 130 can determine the distance between the imaging system 100 and the object based on the particular distance between the feature and the corresponding feature, and based on the spatial arrangement of the first image sensor 116 and the second image sensor 126.

Additionally or alternatively, the controller 130 can be configured to determine a three-dimensional image of the field of view of the imaging system 100 based on the third image and the depth information. In the example of the object described above, the depth information can further include distance between the imaging system 100 and several features of the object. Thus, in this example, based on the depth information and the third image, the controller 130 can be configured to determine three-dimensional aspects of the object and provide a three-dimensional image of the field of view representing the three-dimensional aspects.

In examples where the imaging system 100 includes a first optical element 116 and a second optical element 126 configured to provide a substantially same depth of field, respectively, to the first image sensor 112 and the second image sensor 122, the controller 130 can be configured to align features of the first image and corresponding features of the second image based on the substantially same depth of field. For example, the first optical element 116 can include one or more lens configured to focus light form the field of view onto the first image sensor 112 to provide a first depth of field to the first image sensor 112. Similarly, the second optical element 126 can be configured to provide a second depth of field to the second image sensor 122. In some examples, the first optical element 116 and the second optical element 126 can be configured such that the first depth of field is substantially same as the second depth of field. Thus, in these examples, the controller 130 can be configured to align features of the first image with corresponding features of the second image based on the substantially same depth of field.

In some examples, the controller 130 can be configured to operate the first image sensor 112 and the second image sensor 122 to control the luminance content of the first image and luminance content of the second image based on focal numbers of the first optical element 116 and the second optical element 126. Focal number can be a ratio of an optical element's focal length to a diameter of the optical element. The focal number can be a measure of lens speed. The lens speed can be a measure of luminance content delivered by the optical element per unit time. Thus, in this example, the controller 130 can operate the first image sensor 112 and the second image sensor 122 to collect light from the field of view for a given time, based on the focal numbers of the first optical element 116 and the second optical element 126, such that the given time corresponds to the luminance content of the first image and the luminance content of the second image.

Additionally or alternatively, the first optical element 116 and the second optical element 126 can be configured to have substantially same focal numbers. For example, the imaging system 100 can be configured such that the luminance content of the first image is greater than the luminance content of the second image based on the substantially same focal numbers and the color filter 124 adjacent to the second image sensor 122. In this example, a representation of luminance from the field of view through the first optical element 116 and the second optical element 126 is substantially same due to the substantially same focal numbers. However, in this example, luminance incident on the first image sensor 112 is greater than luminance incident on the second image sensor 122 due to the color filter 124 adjacent to the second image sensor 122 filtering a portion of the incident light 102 from the field of view.

The controller 130 can optionally include a processor 132 and a memory 134. The processor 132 can be configured to receive data indicative of the first image and the second image, respectively, from the first camera 110 and the second camera 120. The processor 132 can perform the functions of the controller 130 described herein to determine the third image based on the first image and the second image. In some examples, the processor 132 can be a computing system that executes software stored in the memory 134 to cause the imaging system 100 to process the first image and the second image to determine the third image, in accordance with at least some of the embodiments described herein. For example, the memory 134 can include instructions executable by the processor 132 to operate the first camera 110 and the second camera 110 to capture the first image and the second image.

The imaging system 100 can optionally include a display 140 connected to the controller 130 via interconnects 108. For example, the imaging system 100 can be a smart phone with a touch screen display. In this example, the smart phone can show the third image having the luminance content of the first image and the color content of the second image on the touch screen display. The display 140 can include, for example, a liquid crystal display (LCD), an array of light emitting diodes (LED), or any other display known in the art. The display 140 can be configured to receive data indicative of the third image from the controller 130 and provide the third image for display. In some examples, the third image can include a three-dimensional image of the field of view of imaging system 100 and the display 140 can be configured to display the three-dimensional image. In some examples, the display 140 can receive input from a user indicative of controlling the imaging system 100. For example, the display 140 can be a touch screen display configured to receive an input from a user. In this example, the input can be communicated to the controller 130, and can cause the controller 130 to instruct the first camera 110 and the second camera 120 to capture, respectively, the first image and the second image. Thus, in this example, the controller 130 can process the first image and the second image and provide the third image to the display 140 for display to the user.

It is noted that the block diagram shown in FIG. 1 is described in connection with functional modules for convenience in description. For example, while the functional blocks in FIG. 1 shown as the first camera 110 and the second camera 120 can be implemented by separately packaged components electrically connected to the controller 130, they do not necessarily need to be implemented as physically separated modules. The embodiments of the imaging system 100 can be arranged with one or more of the functional modules ("subsystems") implemented in a single chip, integrated circuit, and/or physical component. Additionally or alternatively, the color filter 124 and the second image sensor 122 can be implemented with the same physical device. For example, some charge-coupled devices (CCD) can both receive incident light 102 and determine colors represented in the incident light 102 simultaneously.

Figure 2B:
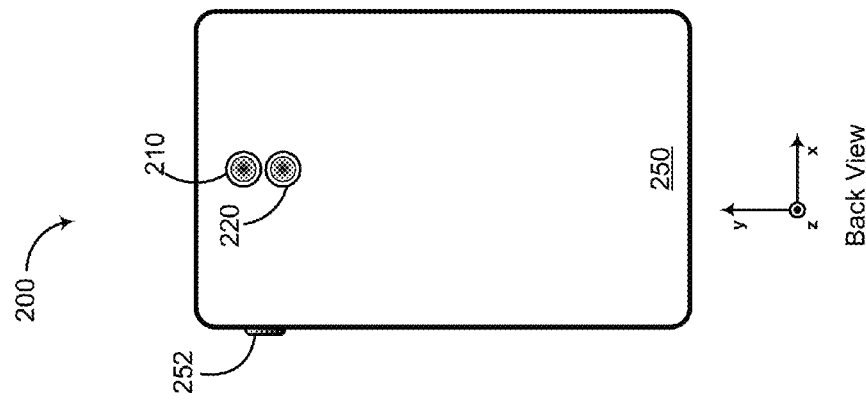
FIG. 2B is a back view of the example device shown in FIG. 2A.
Figure 2A:
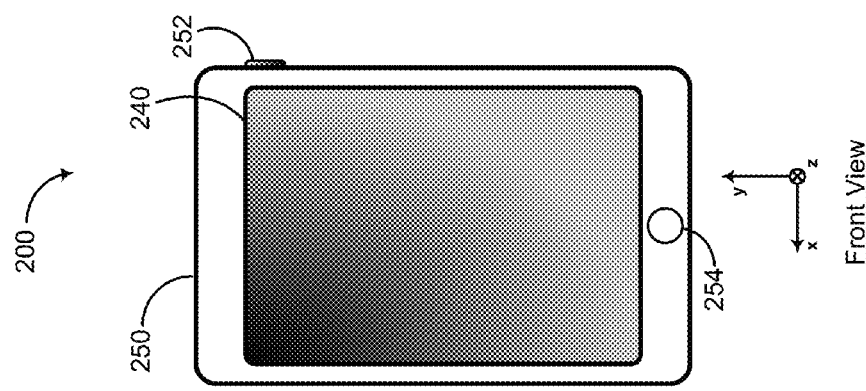
FIG. 2A is a front view of an example device.

FIG. 2A is a front view of an example device 200. FIG. 2B is a back view of the example device 200 shown in FIG. 2A. It is noted that the relative dimensions in FIGS. 2A and 2B are not necessarily to scale, but have been rendered for purposes of explanation only in describing an arrangement of the example device 200. The device 200 includes various elements such as a first camera 210, a second camera 220, a display 240 and a body 250. The body 250 includes a first button 252 and a second button 254 configured to receive input for the device 200. Additionally or alternatively, the display 240 can receive input for the device 200. For example, the display 240 can be a touch screen display configured to receive input when a user touches the display 240. For illustration purposes, an x-y-z axis is shown in the illustrations of FIGS. 2A and 2B. The "Front View" shown in FIG. 2A corresponds to the side of the device 200 including the display 240 and the second button 254 viewable along the z-axis pointing out of the page as illustrated in FIG. 2A. The "Back View" shown in FIG. 2B corresponds to the side of the device 200 including the first camera 210 and the second camera 220 viewable along the z-axis pointing into the page as illustrated in FIG. 2B. Although the device 200 is depicted in FIGS. 2A-2B as a tablet computer, other embodiments are possible. For instance, the device 200 can be a digital camera, smartphone, wearable computer, or a laptop computer, among other examples.

The functions performed by elements included in the device 200 such as the first camera 210, the second camera 220, and the display 240 can be similar to the functions described, respectively, for the first camera 110, the second camera 120, and the display 140 in the discussion of FIG. 1. For example, the first camera 210 can be configured to capture a first image having a first pixel resolution and including a representation if a luminance content of the field of view of the device 200, and the second camera 220 can be configured to capture a second image having a second pixel resolution and including a representation of a color content of the field of view of the device 200. Similarly to the discussion in FIG. 1, the first pixel resolution can be indicative of a spatial resolution of the first image, and the second pixel resolution can be indicative of a spectral resolution of the second image. Additionally, the display 240 can be configured to display a third image determined by the device 200 based on the first image and the second image. The third image can have a third pixel resolution indicative of the spatial resolution of the first image and the spectral resolution of the second image.

The first camera 210 and the second camera 220 are disposed on a same side ("Back View") facing a field of view of the device 200 as shown in FIG. 2B. In some examples, the first camera 210 and the second camera 220 can be disposed on any side (e.g., "Front View", etc.) of the device 200 such that both the first camera 210 and the second camera 220 are facing a same field of view of the device 200. In some examples, the first camera 210 and the second camera 220 can be arranged along a same axis. For example, in FIG. 2B, the first camera 210 and the second camera 220 are arranged along the y-axis. In other examples, the first camera 210 and the second camera 220 can be arranged along a different axis (e.g., x-axis, etc.). In some examples, the same axis corresponds to an axis along a side of the first image and an axis along a corresponding side of the second image. For example, the third image determined based on the first image and the second image can be provided to display 240 such that the axis along a side of the third image (e.g., y-axis in FIG. 2A) is substantially same as the axis along which the first camera 210 and the second camera 220 are arranged (e.g., y-axis in FIG. 2B).

FIG. 2C is a side view of the example device 200 shown in FIGS. 2A and 2B. Incident light 202 from the field of view of the device 200 is incident upon both the first camera 210 and the second camera 220, in accordance with the embodiments described herein similarly to incident light 102 described in the discussion of FIG. 1. The "Side View" shown in FIG. 2C corresponds to the side of the device 200 including the first button 252 viewable along the x-axis pointing out of the page as illustrated in FIG. 2C.

FIG. 2D is a block diagram of the example device 200 shown in FIG. 2C. The functions and configuration of some elements of the device 200 shown in FIG. 2D such as the first camera 210, the second camera 220, the controller 230, interconnects 204, 206 and 208, is similar, respectively, to the first camera 110, the second camera 120, the controller 130, interconnects 104, 106, and 108 described in the discussion of FIG. 1. For example, the controller 230 can be configured to receive data indicative of the first image and the second image, respectively, from the first camera 210 and the second camera 220, via interconnects 204 and 206. In this example, the controller 230 can be configured to determine the third image based on the first image and the second image and provide the third image for display via interconnects 208 to the display 240.

The first camera 210 can include a first image sensor 212 and a first optical element 216. The incident light 202 from the field of view of the device 200 can propagate through the first optical element 216 onto the first image sensor 212. The first image sensor 212 can be configured to capture the first image and provide data indicative of the first image to the controller 230 via interconnects 204. The first optical element 216 can be similar to the first optical element 116 included in the imaging system 100, in accordance with the discussion of FIG. 1. For example, the optical element 116 can include one or more lens, prisms, mirrors or any other optical element configured to focus and/or selectively direct incident light 202 onto the first image sensor 212. The first image generated by the first image sensor 212 can include a representation of luminance content (e.g., brightness, luma data, etc.) in the field of view of the device 200.

The second camera 220 can include a second image sensor 222 and a second optical element 226 similarly to the second image sensor 122 and the second optical element 126 included in the discussion of imaging system 100 in FIG. 1. Additionally, the second camera 220 can include a color filter 224 similar to the color filter 124 in the discussion of FIG. 1. The color filter 124 can be arranged adjacent to the second image sensor 222 and along a path of the incident light 202. The second image sensor 222 can be configured to generate the second image including a representation of a color content (e.g., chrominance, chroma data, colors, etc.) of the field of view of device 200 based on the color filter 224. The second image sensor 222 can be configured to provide data indicative of the second image to the controller 230 via interconnects 206.

Although illustrated in FIG. 2D that the first optical element 216 and the second optical element 226 are arranged along a back surface 256 (e.g., along the "Back View" illustrated in FIG. 2B) of the body 250, in some examples, the first optical element 216 and the second optical element 226 can be arranged anywhere along the path of the incident light 202 such that the incident light 202 is focused and/or directed by the first optical element 216 and the second optical element 226, respectively, onto the first image sensor 212 and the second image sensor 222. Additionally or alternatively, one or more protective screens can be disposed along the back surface 256 and configured to protect the first optical element 216 and the second optical element 226 (e.g., from scratches, etc.).

Although not illustrated in FIG. 2D, the first camera 210 can optionally include an actuator coupled to the first optical element 216. In some examples, the actuator can include a voice coil motor (VCM), piezoelectric actuator, MEMS, or a shape memory alloy. The actuator can be controlled by the controller 230 and configured to change the position of the first optical element 216 to change the focus and/or depth of field of the first image generated by the first image sensor 212. In some examples, a second actuator can similarly be included in the second camera 220 to change the focus and/or depth of field of the second image generated by the second image sensor 222.

The controller 230 can be configured to operate the first camera 210 and the second camera 220, respectively, via interconnects 204 and 206, in accordance with at least some of the embodiments described herein. In some examples, the controller 230 can be configured to cause the first image sensor 212 to capture the first image and the second image sensor 222 to capture the second image. The first image can have a first pixel resolution indicative of a spatial resolution of the first image and the second image can have a second pixel resolution indicative of a spectral resolution of the second image. The spatial resolution can be indicative of resolution of spatial features (e.g., lines, edges, etc.) in the field of view of the device 200 and the spectral resolution can be indicative of resolution of spectral features (e.g., colors, wavelengths of incident light 202, etc.) in the field of view of the device 200. In some examples, the controller 230 can be configured to determine the third image based on the first image and the second image.

The third image determined by the controller 230 can include luminance content of the first image and color content of the second image. As illustrated in FIG. 2D, the second image generated by the second image sensor 222 can include less luminance content than the first image generated by the first image sensor 212 due to light filtered by the color filter 224. Thus, including the luminance content of the first image in the third image can provide better luminance (e.g., brightness) in the third image than the second image. Additionally, the third image can have a third pixel resolution indicative of the spatial resolution of the first image and the spectral resolution of the second image.

In some examples, the controller 230 can be configured to perform an alignment of features in the first image with corresponding features in the second image to determine the third image. In some examples, the alignment can be based on a spatial arrangement of the first camera 210 and the second camera 220. For example, the first camera 210 and the second camera 220 can be arranged along a same axis. In this example, the same axis can correspond to an axis of a side of the first image and an axis of a corresponding side of the second image. For example, the first image and the second image can each have a width side and a height side. Thus, in some examples, the same axis can correspond to the width side of the first image and the width side of the second image. In this case, the alignment can be performed along the same axis (e.g., width side) to determine the third image. Such an arrangement can simplify the alignment performed by the controller 230 into an alignment along one axis (e.g., the same axis) rather than two axes.

Although illustrated in FIG. 2D that the controller 230 is arranged between the first camera 210 and the second camera 220, the controller 230 can be disposed anywhere within the body 250 of the device 200. For example, the controller 230 can be placed below the first camera 210 and the second camera 220.

In some examples, interconnects 204 and 206 can connect the controller 230, respectively, to the first camera 210 and the second camera 220. Interconnects 208 can connect the controller 230 to other components included in the device 200. For example, interconnects 208 can connect the controller 230 to the display 240, the first button 252, and/or the second button 254. In some examples, the controller 230 can be configured to receive input, via interconnects 208, indicative of operating the first camera 210, the second camera 220, and/or the display 240. For example, a user of the device 200 can touch the display 240 to instruct the controller 230 to operate the first camera 210 and the second camera 220 to capture the first image and the second image. In this example, the controller 230 can also determine the third image and provide the third image to the display 240 for display.

Figure 3:
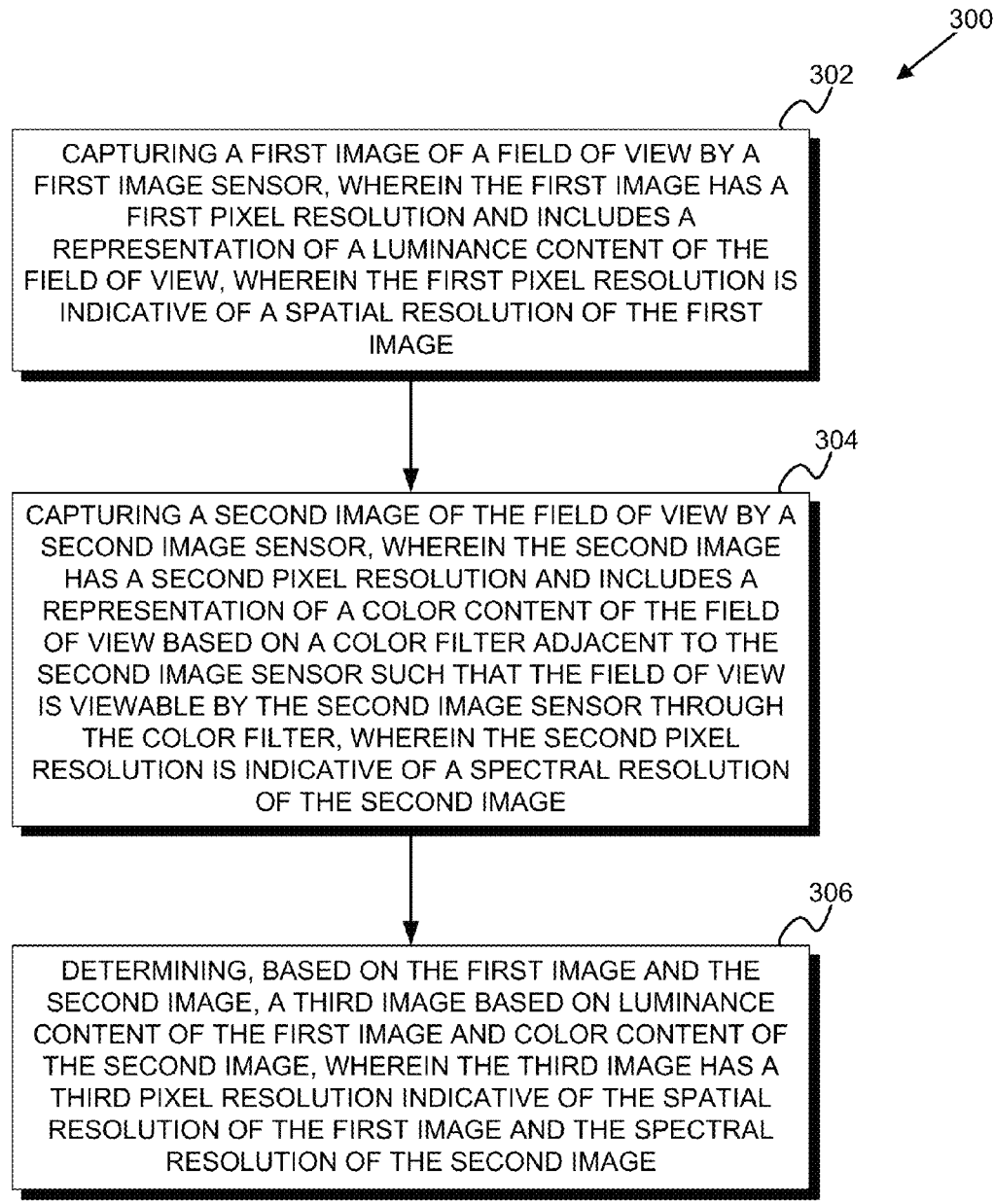
FIG. 3 is a block diagram of an example method for operating an example device, in accordance with at least some embodiments described herein.

FIG. 3 is a block diagram of an example method 300 for operating an example device, in accordance with at least some embodiments described herein. Method 300 shown in FIG. 3 presents an embodiment of a method that could be used with the imaging system 100 and the device 200, for example. Method 300 may include one or more operations, functions, or actions as illustrated by one or more of blocks 302-306. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of a manufacturing or operation process.

At block 302, the method 300 includes capturing a first image of a field of view by a first image sensor, wherein the first image has a first pixel resolution and includes a representation of a luminance content of the field of view, wherein the first pixel resolution is indicative of a spatial resolution of the first image.

At block 304, the method 300 includes capturing a second image of the field of view by a second image sensor, wherein the second image has a second pixel resolution and includes a representation of a color content of the field of view based on a color filter adjacent to the second image sensor such that the field of view is viewable by the second image sensor through the color filter, wherein the second pixel resolution is indicative of a spectral resolution of the second image.

At block 306, the method 300 includes determining, based on the first image and the second image, a third image based on luminance content of the first image and color content of the second image, wherein the third image has a third pixel resolution indicative of the spatial resolution of the first image and the spectral resolution of the second image.

In some examples, the first pixel resolution can be greater than the second pixel resolution. In these examples, the third pixel resolution of the third image can be substantially same as the first pixel resolution of the first image. For example, (step 302) the first image captured by the first image sensor can be a black & white (e.g., grayscale) image including a representation of luminance content in the field of view (e.g., brightness, luma data, etc.). In this example, the second image captured by the second image sensor (step 304) can be a color image due to a color filter adjacent to the second image sensor, the color image including a representation of a color content of the field of view. Thus, (step 306) the third image can be determined having luminance data (e.g., luma data) from the first image and color data (e.g., chroma data) from the second image. The third image can have the third pixel resolution substantially same as the first pixel resolution while incorporating color data of the second image. Since human perception of spatial resolution (e.g., lines, edges, etc.) is more sensitive than spectral resolution (e.g., colors), a viewer of the third image will perceive the superior spatial resolution and luminance (e.g., brightness) of the first image and the spectral resolution and color content of the second image.

Figure 4:
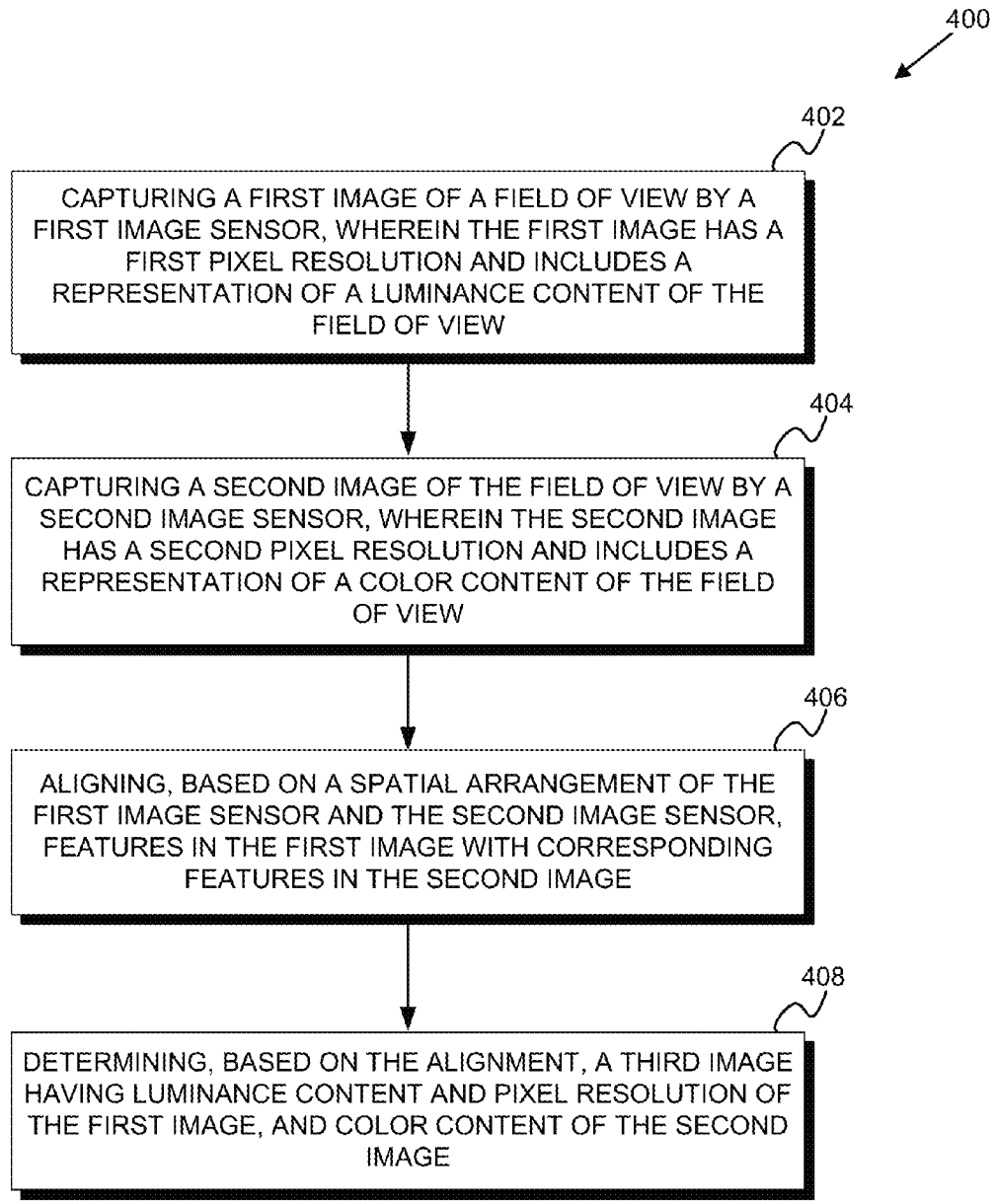
FIG. 4 is a block diagram of an example method for operating an example device including two image sensors to align images captured by the two image sensors, in accordance with at least some embodiments described herein.

FIG. 4 is a block diagram of an example method 400 for operating an example device including two image sensors to align images captured by the two image sensors, in accordance with at least some embodiments described herein. Method 400 shown in FIG. 4 presents an embodiment of a method that could be used with the imaging system 100 and/or the device 200, for example. Method 400 may include one or more operations, functions, or actions as illustrated by one or more of blocks 402-408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the flowchart shows functionality and operation of one possible implementation of present embodiments. In this regard, each block may represent a module, a segment, or a portion of a manufacturing or operation process.

At block 402, the method 400 includes capturing a first image of a field of view by a first image sensor, wherein the first image has a first pixel resolution and includes a representation of a luminance content of the field of view.

At block 404, the method 400 includes capturing a second image of the field of view by a second image sensor, wherein the second image has a second pixel resolution and includes a representation of a color content of the field of view.

At block 406, the method 400 includes aligning, based on a spatial arrangement of the first image sensor and the second image sensor, features in the first image with corresponding features in the second image.

At block 408, the method 400 includes determining, based on the alignment, a third image having luminance content and pixel resolution of the first image, and color content of the second image.

For example, a computing device (e.g., smartphone, digital camera, tablet, etc.) can include a first image sensor and a second image sensor. The computing device can cause the first image sensor to capture a first image of a dog in a field of view of the computing device (step 402). The first image can have a first pixel resolution and include a representation of a luminance content (e.g., brightness of fur) of the dog. The computing device can also cause the second image sensor to capture a second image of the field of view (step 404) that has a second pixel resolution and includes a color content of the field of view (e.g., color of the fur of the dog). The computing device can align, based on the spatial arrangement of the first image sensor and the second image sensor, features in the first image with corresponding features of the second image (step 406). For example, a nose of the dog in the first image can be aligned with the nose of the dog in the second image. The computing device can then determine a third image of the dog (step 408), based on the alignment of the noses, that includes the brightness of the fur from the first image and the color of the fur from the second image.

Figure 5:
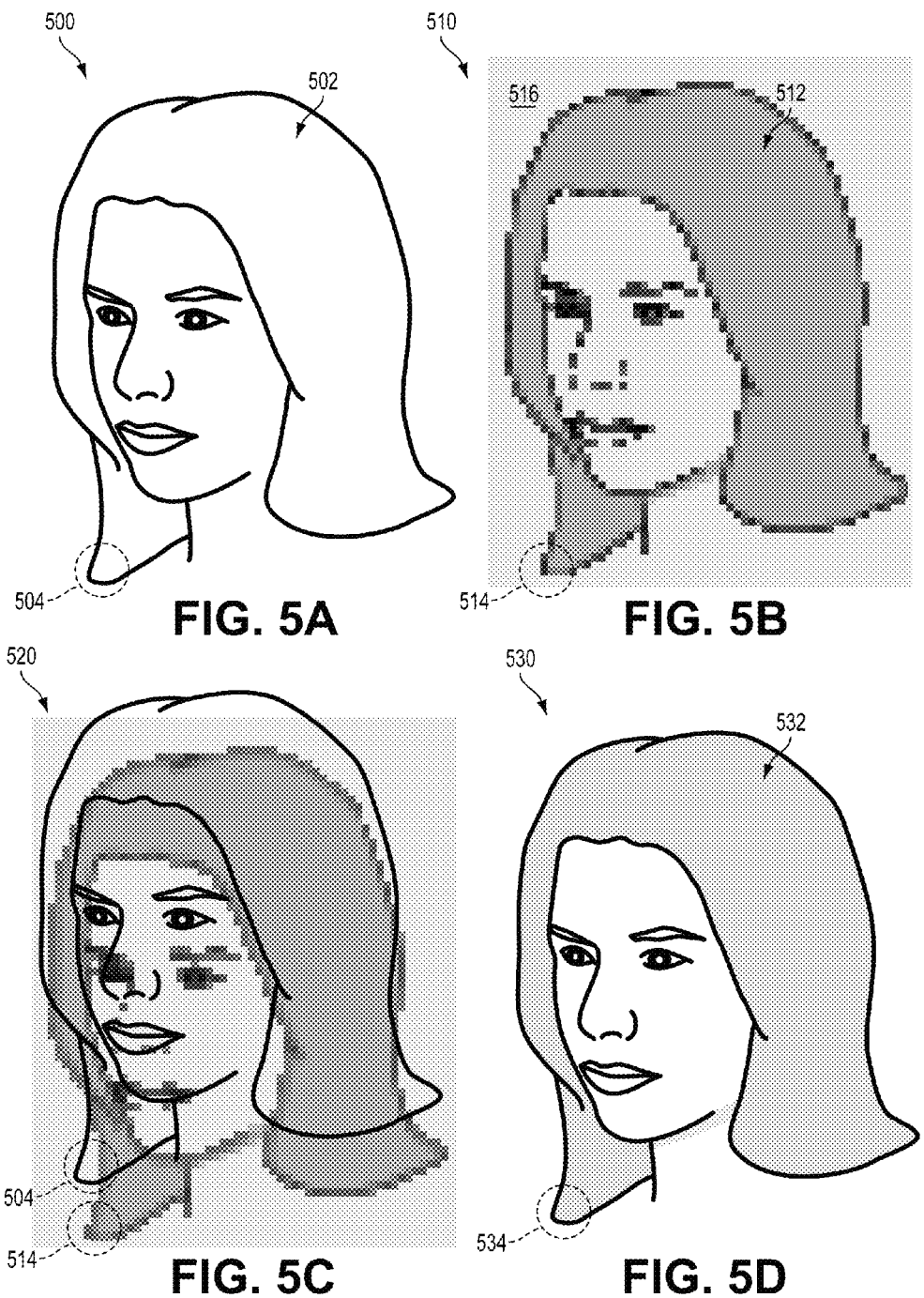
FIG. 5A illustrates an example first image captured by a first image sensor in an example device, in accordance with at least some embodiments described herein.
FIG. 5B illustrates an example second image captured by a second image sensor in the example device described in FIG. 5A, in accordance with at least some embodiments described herein.
FIG. 5C illustrates an example combined image that includes the first image superimposed on the second image described in FIGS. 5A-5B.
FIG. 5D illustrates an example third image determined by the example device described in FIGS. 5A-5C, in accordance with at least some embodiments described herein.

FIG. 5A illustrates an example first image 500 captured by a first image sensor in an example device, in accordance with at least some embodiments described herein. The first image 500 of a field of view can be generated by the first image sensor with a first pixel resolution similar to the first image sensors 112 and 212 described, respectively, in the imaging system 100 and the device 200, for example. The first pixel resolution can be indicative of a spatial resolution of the first image (e.g., sharpness of feature 504). The first image 500 as illustrated in FIG. 5A only contains black lines and white background for illustrative purposes. However, in some embodiments, the first image 500 can include gray colors similar to a grayscale image corresponding to areas in the field of view of the first image sensor that include colors. Additionally or alternatively, the black lines illustrating edges in the image 500 can include various shades, intensities, etc. of gray similarly to a grayscale image. Additionally, for illustrative purposes, the background of the first image 500 is illustrated in a white color. However, in some embodiments, the background color can include varying shades of gray similarly to a grayscale image.

The first image 500, as illustrated, includes hair 502 having no color content. For example, the hair 502 is illustrated in a white color to indicate no color content is included in the first image 500. Other features such as eyes included in the first image 500 are also lacking color content due to the configuration of the first image sensor being similar to the first image sensors 112 and 212 discussed in FIGS. 1-2. The first image 500 includes a feature 504 (e.g., edge of hair) in the first image 500. The feature 504 can be used to align the first image 500 with a second image, in accordance with at least some embodiments described herein.

FIG. 5B illustrates an example second image 510 captured by a second image sensor in the example device described in FIG. 5A, in accordance with at least some embodiments described herein. The second image 510 of the field of view can be generated by the second image sensor having a second pixel resolution similarly to the second image sensors 122 and 222 described, respectively, in the imaging system 100 and the device 200, for example. The second pixel resolution can be indicative of a spectral resolution of the second image (e.g., colors included in hair, eyes, etc.). The second image 510 as illustrated in FIG. 5B only contains gray colors for illustrative purposes. However, in some embodiments, the second image 510 can include colors (e.g., red, green, blue, yellow, brown, etc.) corresponding to various features of the second image 510. For example, hair 512 included in the second image 510 can be yellow (illustrated as dark gray color in FIG. 5B). Additionally or alternatively, in some examples, features included in the hair 512 can include more than one color (e.g., highlights).

Notably, in this example, the second pixel resolution of the second image 510 is lower than the first pixel resolution of the first image 500. For example, the feature 504 (e.g., edge of hair) included in the first image 500 is sharper than corresponding feature 514 (e.g., corresponding edge of hair) included in the second image 510. Additionally, the second image 510 captured by the second image sensor contains less luminance content (e.g., brightness) than the first image 500. The lower luminance content of the second image 510 is illustrated in FIG. 5B by the generally darker features such as background 516 (e.g., illustrated as a shade of gray) of the second image 510 compared to corresponding features in the first image 500 shown in FIG. 5A.

FIG. 5C illustrates a combined image 520 that includes the first image 500 superimposed on the second image 510 described in FIGS. 5A-5B to illustrate a misalignment between the first image 500 and the second image 510, in accordance with at least some embodiments described herein. For example, the feature 504 and the corresponding feature 514 are spatially misaligned in the combined image 520. In some examples, the misalignment can be due to a spatial arrangement of the first image sensor and the second image sensor, similarly to the discussion in FIGS. 1-2. In other examples, the misalignment can be due to an inclination angle of the device including the first image sensor and the second image sensor relative to the feature 504 and the corresponding feature 514.

In some examples, the device configured to capture the first image 500 and the second image 510 can also be configured to correct the misalignment based on the feature 504 and the corresponding feature 514. For example, imaging system 100, device 200, and methods 300-400 described in the present disclosure describe a process for correcting such misalignment based on the feature 504 and the corresponding feature 514. In some examples, correcting the misalignment can be based on more than one feature (e.g., several lines, several edges, etc.) of the first image 500 with corresponding features in the second image 510. In some examples, a controller can be included in the device similar to the controllers 130 and 230 included, respectively, in the imaging system 100 and the device 200 described in FIGS. 1-2.

FIG. 5D illustrates an example third image 530 determined by the example device described in FIGS. 5A-5C, based on luminance content of the first image 500, color content of the second image 510, and alignment of combined image 520, shown in FIGS. 5A-5C, in accordance with at least some embodiments described herein. In some examples, the third image 530 of the field of view can be generated by a controller to have a third pixel resolution similarly to the controllers 130 and 230 described, respectively, in the imaging system 100 and the device 200 using a process similar to the process described in methods 300-400, for example. The third image 530 can be similar to the third image described in accordance with FIGS. 1-4 included in the present disclosure.

Notably, the third image 530 includes the luminance content of the first image 500. For example, the background of the third image 530 is brighter than background 516 of the second image 510 similarly to the background of the first image 500. Additionally, in this example, the color of hair 532 included in the third image 530 is brighter than the color of hair 512 included in the second image 512 (e.g., illustrated as a brighter shade of gray). For example, the color of hair 512 in the second image 510 can be dark green, and the color of hair 532 in the third image 530 can be a brighter green. Thus, the third image 530 includes luminance content of the first image 500 and color content of the second image 510.

Additionally, the third image 530 illustrates a successful alignment of features included in the first image 500 with corresponding features in the second image 510. Such a misalignment is illustrated in the combined image 520, for example, in feature 504 and corresponding feature 514. In the third image, the feature 504 in the first image 500 and the corresponding feature 514 in the second image 510 are combined as illustrated into combined feature 534.

The third image 530, as illustrated in FIG. 5D, has a third pixel resolution substantially same as the first pixel resolution of the first image 500. For example, the feature 504 (e.g., edge of hair) included in the first image 500 and the combined feature 534 in the third image 530 illustrate substantially same sharpness. Thus, in this example, the third image 530 includes the spatial resolution of the first image 500 and the spectral resolution of the second image 510. Since human perception of spatial resolution is more sensitive than spectral resolution, the third image appears as having the superior quality (e.g., spatial resolution) of the first image 500 while including the color content of the second image 510.

Figure 6:
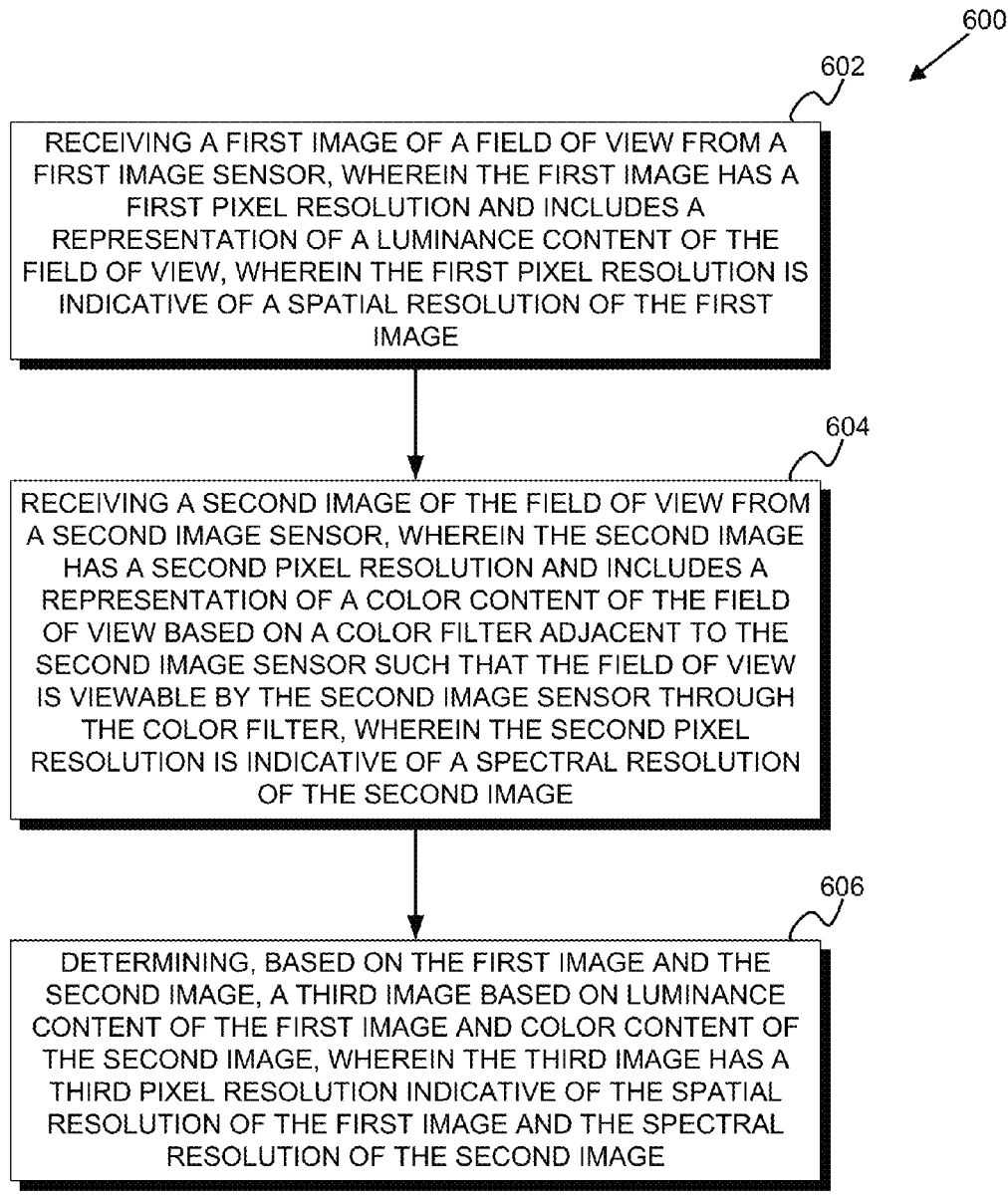
FIG. 6 is a block diagram of an example method for operating a computing device, in accordance with at least some embodiments described herein.

FIG. 6 is a block diagram of an example method 600 for operating a computing device, in accordance with at least some embodiments described herein. Method 600 shown in FIG. 6 presents an embodiment of a method that could be used with the imaging system 100 and/or the device 200, for example. Method 600 may include one or more operations, functions, or actions as illustrated by one or more of blocks 602-604. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of a manufacturing or operation process.

At block 602, the method 600 includes receiving a first image of a field of view from a first image sensor, wherein the first image has a first pixel resolution and includes a representation of a luminance content of the field of view, wherein the first pixel resolution is indicative of a spatial resolution of the first image.

At block 604, the method 600 includes receiving a second image of a field of view from a second image sensor, wherein the second image sensor has a second pixel resolution and includes a representation of a color content of the field of view based on a color filter adjacent to the second image sensor such that the field of view is viewable by the second image sensor through the color filter, wherein the second pixel resolution is indicative of a spectral resolution of the second image.

At block 606, the method 600 includes determining, based on the first image and the second image, a third image based on luminance content of the first image and color content of the second image, wherein the third image has a third pixel resolution indicative of the spatial resolution of the first image and the spectral resolution of the second image.

In some examples, a computing device such as a personal computer or server computer can be configured to perform the method 600. In other examples, a processor similar to the processor 132 included in the discussion of FIG. 1 can be configured to perform the method 600.

For example, (steps 602 and 604) a computing device can receive data indicative of a first image and a second image captured, respectively, by a first image sensor and a second image sensor included in an imaging device (e.g., camera, smartphone, tablet, etc.). The first image can have a first pixel resolution indicative of a spatial resolution (e.g., edges, lines, etc.) of the first image and the second image can have a second pixel resolution indicative of a spectral resolution (e.g., colors, chrominance, etc.) of the second image. The computing device can be configured to determine a third image based on luminance content of the first image and color content of the second image (step 606). The third image can have a third pixel resolution indicative of the spatial resolution of the first image and the spectral resolution of the second image. In this example, the computing device can optionally communicate data indicative of the third image back to the imaging device for display.

Figure 7:
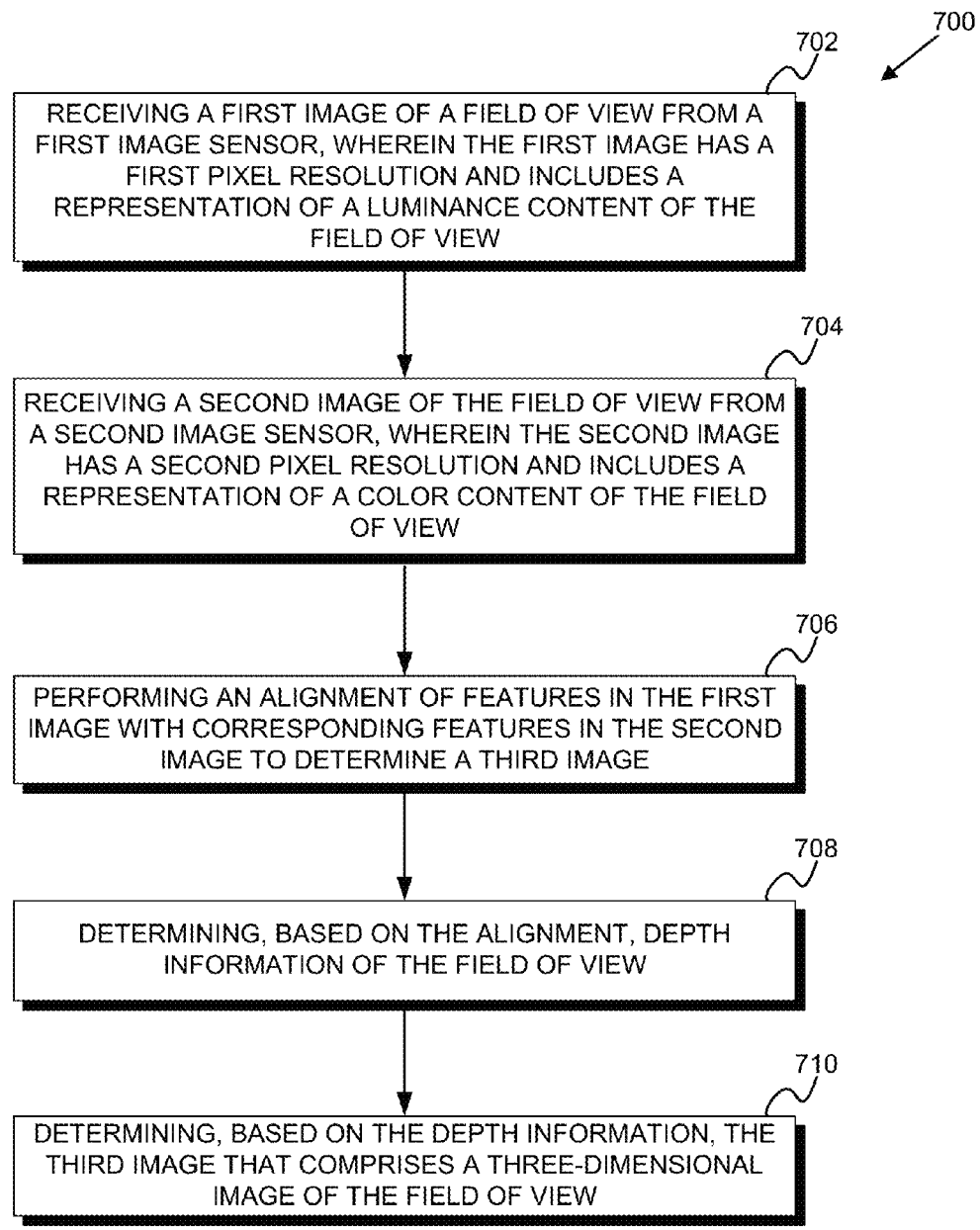
FIG. 7 is a block diagram of an example method for operating a computing device to determine a three-dimensional image, in accordance with at least some embodiments described herein.

FIG. 7 is a block diagram of an example method 700 for operating a computing device to determine a three-dimensional image, in accordance with at least some embodiments described herein. Method 700 shown in FIG. 7 presents an embodiment of a method that could be used with the imaging system 100 and/or the device 200, for example. Method 700 may include one or more operations, functions, or actions as illustrated by one or more of blocks 702-710. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of a manufacturing or operation process.

At block 702, the method 700 includes receiving a first image of a field of view from a first image sensor, wherein the first image has a first pixel resolution and includes a representation of a luminance content of the field of view.

At block 704, the method 700 includes receiving a second image of the field of view from a second image sensor, wherein the second image has a second pixel resolution and includes a representation of a color content of the field of view.

At block 706, the method 700 includes performing an alignment of features in the first image with corresponding features in the second image to determine a third image.

At block 708, the method 700 includes determining, based on the alignment, depth information of the field of view.

At block 710, the method 700 includes determining, based on the depth information, the third image that comprises a three-dimensional image of the field of view.

For example, a computing device such as processor 132 described in FIG. 1 can be configured to receive a first image from a first image sensor of a field of view of the computing device (step 702). The computing device can also be configured to receive a second image from a second image sensor of the field of view of the computing device (step 704). The computing device can be configured to perform an alignment (step 706) of features in the first image with corresponding features in the second image similarly to the alignment described in the discussion of FIGS. 5A-5D of the present disclosure. Based on the alignment, (step 708) the computing device can determine depth information of the field of view of the computing device. For example, the computing device can determine a first distance between corresponding features in the first image and the second image when the first image is superimposed on the second image (e.g., similarly to FIG. 5C). Additionally, the computing device can receive information indicative of a second distance between the first image sensor and the second image sensor. Based on the first distance and the second distance, the computing device can determine a third distance (e.g., depth information) between the computing device and the feature in the field of view. In some examples, the computing device can repeat this procedure with other features in the field of view to determine a third image comprising a three-dimensional image of the field of view (step 710).

Figure 8:
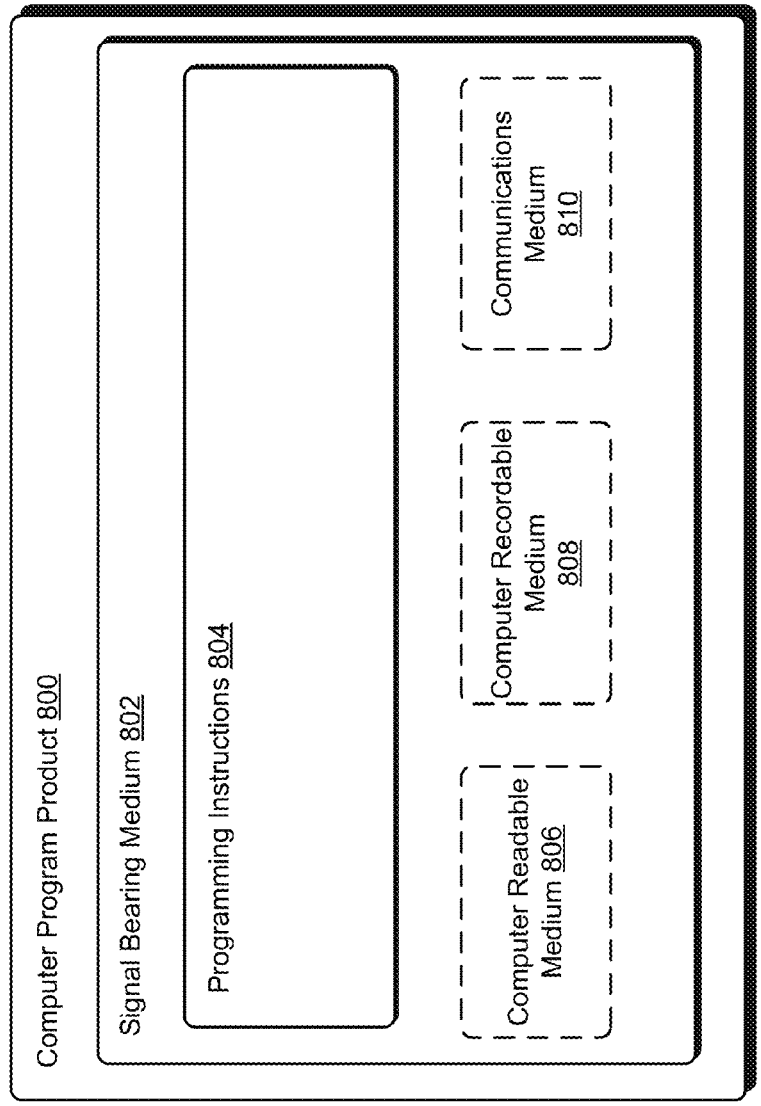
FIG. 8 depicts an example computer-readable medium configured according to at least some embodiments described herein.

FIG. 8 depicts an example computer-readable medium configured according to at least some embodiments described herein. In example embodiments, the example system can include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. methods 300, 400, 600, and 700) can be implemented by computer program instructions encoded on a non-transitory computer readable storage media in a machine-readable format, or on other non-transitory media or articles of manufacture (e.g., the instructions stored on the memory 134 of the controller 130 of the imaging system 100). FIG. 8 is a schematic illustrating a conceptual partial view of an example computer program product that includes a computer program for executing a computer process on a computing device, arranged according to at least some embodiments disclosed herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-7. In some examples, the signal bearing medium 802 can be a non-transitory computer-readable medium 806, such as, but not limited to, a hard disk drive, a Compact Disc (CD), a Digital Video Disk (DVD), a digital tape, memory, etc. In some implementations, the signal bearing medium 802 can be a computer recordable medium 808, such as, but not limited to, memory, read/write (R/W) CDs, R/W DVDs, etc. In some implementations, the signal bearing medium 802 can be a communication medium 810 (e.g., a fiber optic cable, a waveguide, a wired communications link, a wireless communication link, etc.). Thus, for example, the signal bearing medium 802 can be conveyed by a wireless form of the communications medium 810.

The one or more programming instructions 804 can be, for example, computer executable and/or logic implemented instructions. In some examples, a computing device such as the processor-equipped controllers 130 and 230 of FIGS. 1 and 2 is configured to provide various operations, functions, or actions in response to the programming instructions 804 conveyed to the computing device by one or more of the computer readable medium 806, the computer recordable medium 808, and/or the communications medium 810. In other examples, the computing device can be an external device such as a server or personal computer in communication with an imaging device such as imaging system 100 or device 200.

The non-transitory computer readable medium 806 can also be distributed among multiple data storage elements, which could be remotely located from each other. The computing device that executes some or all of the stored instructions could be an external computer, or a mobile computing platform, such as a smartphone, tablet device, personal computer, head-mounted device, etc. Alternatively, the computing device that executes some or all of the stored instructions could be remotely located computer system, such as a server. For example, the computer program product 800 can implement the functionalities discussed in the description of FIGS. 1-7.

Within examples, operation methods that are described for the device can be applied to other electronic devices that include two image sensors. For example, telescopes, microscopes and other optical instruments that are configured to provide an image of a field of view can be equipped with two image sensors configured similarly to the devices and methods described in the present disclosure. Thus, example methods herein provide operation methods that involve a device including a first image sensor configured to capture a first image, a second image sensor configured to capture a second image and determining a third image based on the first image and the second image having a spatial resolution and luminance content of the first image and a spectral resolution and color content of the second image.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device comprising:
a first image sensor that provides a first image of a field of view of the device;
a second image sensor that provides a second image of the field of view;
a color filter optically coupled to the second image sensor such that the field of view is viewable to the second image sensor through the color filter; and
a controller that determines one or more characteristics of the first image and the second image, wherein the controller provides a third image of the field of view based on at least the determined one or more characteristics, and
wherein the controller, based on at least a misalignment between features in the first image and corresponding features in the second image being greater than a threshold, provides the second image as the third image.

2. The device of claim 1, wherein the first image has a first pixel resolution that differs from a second pixel resolution of the second image.

3. The device of claim 2, wherein the first pixel resolution is greater than the second pixel resolution.

4. The device of claim 2, wherein the third image also has the first pixel resolution of the first image, and wherein the third image indicates color content of the second image.

5. The device of claim 1, wherein a spatial resolution of the third image is based on the first image, and wherein a spectral resolution of the third image is based on the second image.

6. The device of claim 1, further comprising:
a first optical element configured to focus light from the field of view onto the first image sensor; and
a second optical element configured to focus light from the field of view onto the second image sensor.

7. The device of claim 6, wherein the first optical element and the second optical element are configured to provide the first image sensor and the second image sensor with a substantially same depth of field.

8. The device of claim 6, wherein the first optical element and the second optical element have substantially same focal numbers.

9. The device of claim 8, wherein luminance of light propagating through the first optical element is substantially same as luminance of light propagating through the second optical element based on the first optical element and the second optical element having the substantially same focal numbers.

10. The device of claim 8, wherein luminance content of the first image is greater than luminance content of the second image based on (i) the color filter being arranged adjacent to the second image sensor and along a path of the light propagating through the second optical element and (ii) the first optical element and the second optical element having the substantially same focal numbers.

11. A method comprising:
capturing a first image of a field of view via a first image sensor;

capturing a second image of the field of view via a second image sensor, wherein the second image sensor is optically coupled to a color filter such that the field of view is viewable to the second image sensor through the color filter;

determining one or more characteristics of the first image and the second image; and providing a third image of the field of view based on at least the determined one or more characteristics, wherein providing the third image comprises providing the second image as the third image based on at least a misalignment between features in the first image and corresponding features in the second image being greater than a given threshold.

12. The method of claim 11, wherein providing the third image comprises modifying the first image to indicate color content of the second image.

13. The method of claim 11, further comprising:

comparing one or more thresholds to the determined one or more characteristics; and determining, based on at least the comparison, whether to incorporate, into the third image, a combination of a characteristic of the first image and a characteristic of the second image.

14. The method of claim 11, wherein providing the third image comprises:

providing the first image as the third image based on at least luminance content of the second image being less than a first threshold or color content of the second image being less than a second threshold.

15. The method of claim 11, wherein providing the third image comprises:

based on at least luminance content of the second image being greater than a first threshold, determining the third image according to luminance content of the first image and color content of the second image.

16. The method of claim 15, wherein deterimining the third image according to the luminance content of the first image and the color content of the second image is based also on the color content of the second image being greater than a second threshold.

17. A non-transitory computer readable medium storing instructions that, when executed by one or more processors of a computing device, cause the computing device to perform operations comprising:

obtaining a first image of a field of view, the first image being captured using a first image sensor;

obtaining a second image of the field of view, the second image being captured using a second image sensor, wherein the second image sensor is optically coupled to a color filter such that the field of view is viewable to the second image sensor through the color filter;

determining one or more characteristics of the first image and the second image; and providing a third image of the field of view based on at least the determined one or more characteristics, wherein providing the third image comprises providing the second image as the third image based on at least a misalignment between features in the first image and corresponding features in the second image being greater than a threshold.

18. The non-transitory computer readable medium of claim 17, wherein the operations further comprise:

aligning, based on a spatial arrangement of the first image sensor and the second image sensor, features in the first image with corresponding features in the second image; and determining the third image based on the alignment.

19. The non-transitory computer readable medium of claim 18, wherein the operations further comprise:

determining, based on the alignment and the spatial arrangement, depth information of the field of view.

* * * * *